INVENTOR.
Herbert G. Johnson

July 13, 1965  H. G. JOHNSON  3,194,041
METHOD FOR FORMING CORRUGATED TUBES
Filed Nov. 7, 1960  2 Sheets-Sheet 2

INVENTOR
Herbert G. Johnson 3,194,041
METHOD FOR FORMING CORRUGATED TUBES
Herbert G. Johnson, 17 N. Drexel Ave., Havertown, Pa.
Filed Nov. 7, 1960, Ser. No. 67,563
13 Claims. (Cl. 72—59)

This invention relates to method for forming corrugated tubes and has for an object the provision of improvements in this art. The term "toroidal" is used herein in its ordinary sense, as in referring to automobile tires and the like wherein the outer portion is generally circular in annular cross-section, this circular annular section herein having a circular arc of considerably more than 180 degrees and being joined to the cylindrical body of the tube by a restricted inner portion which is axially much shorter than the diameter of the annular outer section; the space between adjacent corrugations along the tube being at least as much axially as the diameter of the annular outer section so that the outer annular portions of the corrugations are spaced apart axially.

One of the particular objects of the invention is to form a tube with toroidal corrugations of regular and desired shape in which the corrugations are of substantially uniform wall thickness and diameter and not flattened on the periphery as is so usual with toroidal corrugations made by prior methods, especially when made of plastic materials.

Another object of the invention is to provide an improved method for forming toroidal corrugations in stages and in such manner that the desired uniform wall thickness and radius are obtained.

Another object is to stabilize the shape of the corrugations when formed of a material having memory, that is, having a tendency to return by creep to a prior shape.

Another object is to form a reinforced corrugated tube which has great flexibility and strength, free from incipient points of weakness.

Another object is to make laminated corrugated tubes, either of metallic or non-metallic materials or both.

The above and other objects and advantages of the invention will be apparent from the following description of any exemplary embodiment, reference being made to the accompanying drawings, wherein.

Figure 2:
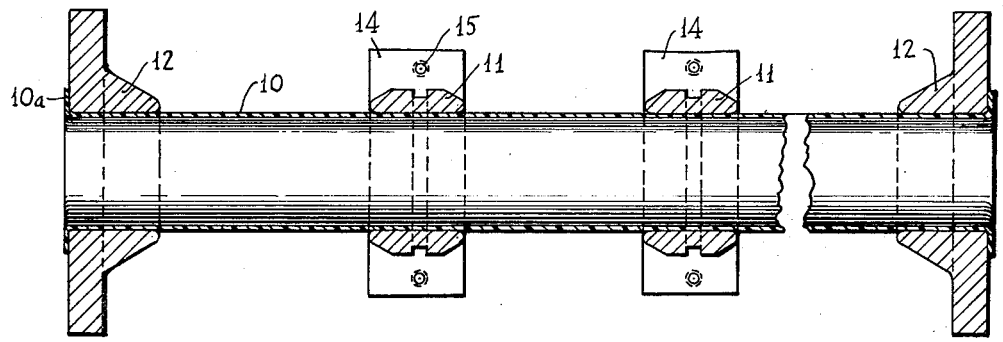
FIG. 2 is a section through a tube with spaced reinforcing rings thereon in preparation for forming corrugations.

In FIG. 2 there is shown a tube 10 having a plurality of intermediate reinforcing rings 11 placed thereon at spaced points along its length (usually evenly spaced) and end reinforcing rings or bands 12 which are to form permanent attachment fittings, the tube having end flanges 10a formed thereon after all the reinforcing rings have been placed on the tube. This end flanging is known as vanstoning. With other forms of end fittings and apparatus, the tube ends may not have flanges formed on them at all, or not until later. Sealing rings may be used on the tubes.

In FIG. 2 there are also shown split ring die members or spacer elements 14 which have semi-circular sockets to embrace the intermediate reinforcing rings 11 to keep them in proper position, well-known means being provided for keeping the members and rings evenly spaced as the corrugations are formed.

Figure 3:
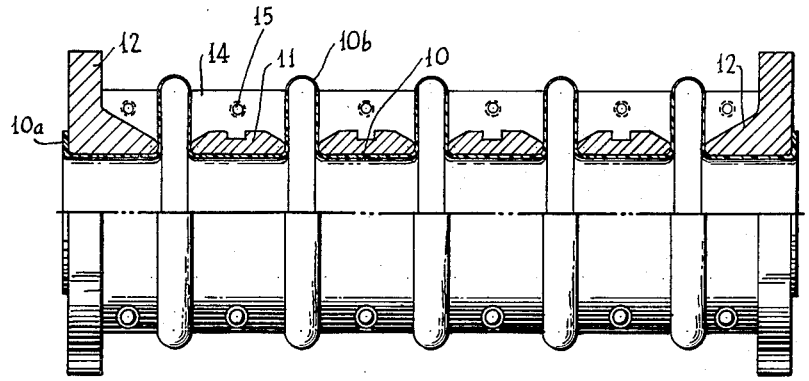
FIG. 3 shows the corrugations after the first stage of formation.

In FIGS. 2 and 3 the split ring die members 14 are shown as being clamped in place, as by quick-operating bolts 15, so as to be removable after the first stage of the corrugation-forming operation has been completed. The members 14 are representative of spacers which cause the tube 10 to first have formed thereon flat-sided corrugations 10b with rounded peripheries.

Figure 4:
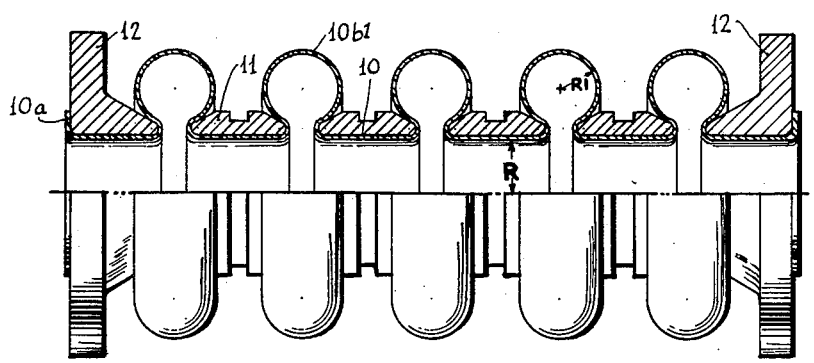
FIG. 4 shows the completed corrugations.

Subsequently, as shown in FIG. 4, the spacers 14 are removed and by continued pressure thereafter the corrugations are expanded on the sides to form the toroidal shape 10b1. The arcuate peripheral portions have been work hardened and largely keep their shape. The reinforcing rings 11 are left on the tube between corrugations to confine and support the straight portions in use.

Figure 5:
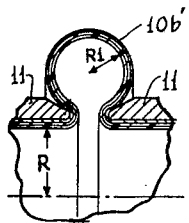
FIG. 5 shows a corrugation formed of a plurality of layers.

FIG. 5 shows part of a single corrugation 10b' which is formed of laminae which are in intimate contact at their faying or contacting surfaces. Such a laminated form is very useful in certain plastics to assure that there are no through-running pin holes to cause leakage. The laminated wall can be dealt with like a single thickness wall because the laminae are in tight intimate contact. If desired, the layers may be adhesively or otherwise bonded together. Plastic lined corrugated metal tubes can be formed in this manner. An outside metal layer is shown in FIG. 5. It is to be understood that the plastic tube may be formed alone; or that one or two layers of plastic may be disposed as liners within a metal tube. Metal tubes alone can be formed by this process and apparatus.

In making laminated tubes of a plastic having creep or memory, such as polymerized fluorocarbon known as "Teflon," "Kel-F," and the like, one tube is stretched hot, as on a mandrel, to expand it to such size that it will just fit over another tube and shrink thereon when cool. It is not cooled in its expanded state to take a set unless it is to be put on later, in which case it would be reheated sufficiently to restore its memory. The laminae fit very tightly without any air between them but are not bonded together unless this is specifically desired because the layers need to have some relative slip while corrugations are being formed. The use of sintered material rather than unsintered material avoids sticking together of the layers of plastic.

Very unusual advantages are obtained by using metal tubes with plastic liners. Metals, such as stainless steel have been used to obtain great strength and corrosion resistance; while the plastic liner protects from injurious substances inside the tube. When a plastic liner, which usually has memory if not formed hot and chilled, is used inside a metal outer tube the liner is formed entirely under compression against the metal by the very high pressure of the fluid needed to form the metal. When compression-formed in this way, the plastic loses its memory characteristics, even at normal room temperature, like it otherwise would with heating and quenching if it were deformed under tensile stresses.

The provision of a metal jacket also provides for brazing or welding the jacket to the reinforcing rings to hold them in position during the forming operation, the plastic liner tube usually being inserted after the rings have been secured to the metal jacket. Fittings can also be attached to the metal jacket.

Figure 1:
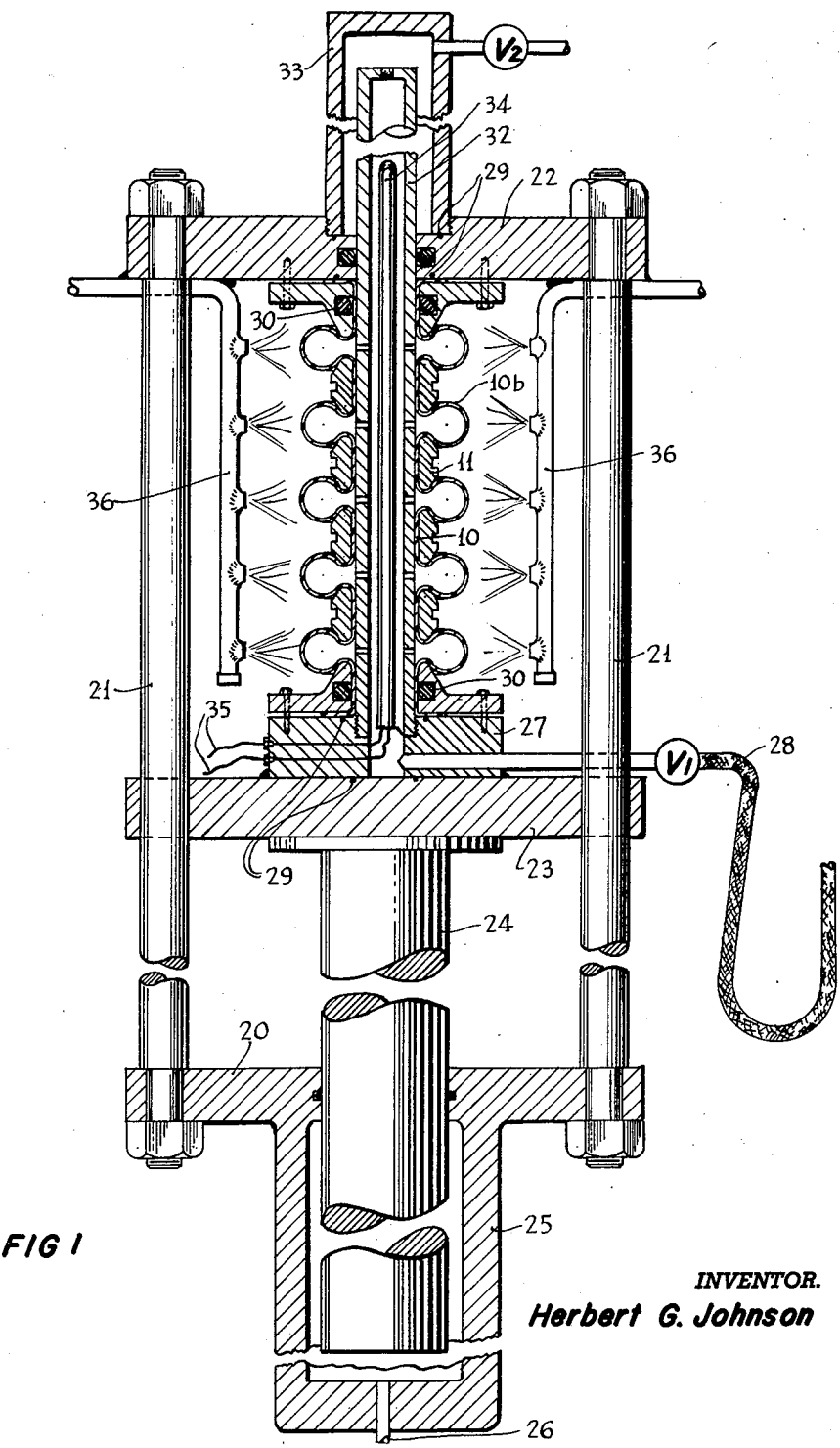
FIG. 1 is an elevation, partly in section and partly diagrammatic, of apparatus for forming a plurality of corrugations simultaneously on a tube.

FIG. 1 shows exemplary apparatus for forming the corrugated tubes. Here a fixed base 20 carries columns 21 which are connected at the top by a fixed head 22. A slidable crosshead 23 moves along the columns under the action of a power ram 24 operating in a fluid pressure cylinder 25. A pipe 26 provides flow of controlled pressure fluid in and out of the cylinder as required for operation of the ram.

A cored plate 27 with a fluid connection hose 28 provides, with a valve V1, a controlled flow of pressure fluid into and out of the tube being corrugated. Seals 29 are provided for the end flanges of the tube when clamped down. O-rings 30 can be provided for the periphery of a straight tube (without end flanges) when it is not desired to have the end flanges on the tube at this stage.

For some purposes it is desirable to have a mandrel 32 located within the tube during formation, the tube here being shown as secured to the cored plate member 27 so as to have fluid enter it. The fluid flows out of spaced holes in the mandrel. A long cap 33, here shown broken for foreshortening in illustration, provides the necessary long movement of the perforated mandrel while preventing leakage.

For some materials it is necessary to heat the mandrel and thereby, together with the hot fluid, to heat the tube interiorly during formation and for this purpose a core heater 34 is shown, this having leads 35 and controls for supplying current at the time and in the amount needed. Memory plastics are known to retain their shape if heated to a temperature above their expected service temperature and then suddenly quenched.

Some materials, such as certain plastics, have "memory," as mentioned before, and need to be cooled quickly after being shaped to desired form, usually hot as by the heating means described or by heated pressure fluid or the like, and for this quenching operation cooling means, here represented by the spray pipes 36, are provided. A valve V2 in an outlet pipe from the cap 33 regulates the outflow under control when the mandrel is pushed up or when heated fluid is circulated.

Figure 6:
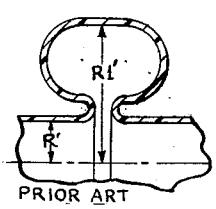
FIG. 6 shows a portion in section of a malformed corrugation as made by prior methods.

It is a feature of this invention that toroidal corrugations are formed without flat outer portions. Such flat portions will get out of shape in use under pressure and do not allow the desired free and even expansion and bending of the bellows tube. Such flat portions, by normal methods of formation, are usually located at the outer periphery of the corrugations. The present method, by confining the corrugations against axial bulging until the desired radial expansion has been attained, causes the formation, after the axial constraint has been removed, of corrugations which in toroidal section are almost circular for over 180 degrees of arc. Also (FIG. 4) the toroidal section radius R1 is less than the initial tube radius R. This is not true of a corrugation formed by previous methods (FIG. 6) where the radius R1' of part of the toroidal section is much greater than the radius R' of the tube itself.

Means, other than the rings 11, could be used for restraining the body of the tube during that part of the operation in which flat-sided corrugations are being formed. Indeed, there is known prior art apparatus for forming flat-sided corrugations; but they do not do any further forming action. According to the advance made by the present invention, it would then be necessary to apply and secure together split rings 11 and then finish the forming of the toroidal corrugations as before. By such an arrangement it would be possible to use step-by-step corrugating apparatus along the lines of that disclosed in my copending application Serial No. 612,818, filed September 28, 1956, now Patent No. 3,105,539, granted October 1, 1963.

Furthermore, if desired, tubes can be made without the reinforcing rings being left thereon by the same provision of split rings (comparable in application and removal to the present split die ring members 14) as just mentioned. Circumferential splitting is also readily provided if the toroidal overhang should give any difficulty in removal. Thin walled tubes, of course, have great yield to assist removal of rings; but heavier walled tubes and stiffer material require special provisions.

The operations of forming corrugated tubes according to the present invention should be clear from the preceding description.

It is thus seen that the present invention provides improved method and apparatus for forming corrugated tubes; and also provides a new and improved corrugated tube.

While certain embodiments of the invention have been described for purposes of illustration, it is to be understood that there may be various embodiments and modifications within the general scope of the invention as defined in the claims hereof.

I claim:

1. The method of forming toroidal corrugations on tubes wherein the toric section is circular for considerably more than 180 degrees, which comprises: confining the tube exteriorly around its circumference at spaced points along its length by die ring elements having flat radial sides; applying fluid pressure within the tube to form a bulge between said axially spaced flat-faced die ring elements; forcing the ends of said bulge axially together while continuing to apply fluid pressure to form a flat-sided corrugation with a crowned periphery; removing said flat-sided die ring elements; restraining the tube at the inner ends of said corrugation against outward radial movement, leaving the outer portion of said corrugation unrestrained against axial expansion; and applying fluid pressure within said corrugation to expand it into a toroidal shape which is approximately circular in section over considerably more than 180 degrees of its outer periphery.

2. The method of forming toroidal corrugations of approximately circular section on their outer periphery for considerably more than a semicircular length of arc, which comprises: confining the tube circumferentially at spaced points along its length by die ring elements having flat radial sides facing an unsupported portion of tube of sufficient length to form a corrugation of the desired size; applying fluid pressure within the tube to form a bulge in said unsupported length of tube; forcing the ends of said bulge together axially while continuing to apply fluid pressure inside said bulge to form a flat-sided corrugation with an arcuate periphery in axial section; removing said flat-sided die ring elements; restraining the tube at the ends and inner part of said corrugation against axial movement and outward radial movement, leaving the outer portion of said corrugation unsupported; and applying fluid pressure within said corrugation to bring it into toroidal shape with the desired cross-section shape.

3. The method as set forth in claim 2, further characterized by the fact that said tube is formed of a plastic material having memory, such as a polymerized fluorocarbon; and forming the corrugation under conditions of controlled temperature, pressure and rate of deformation which stabilize the shape of the corrugation in its final form.

4. The method as set forth in claim 2, further characterized by the fact that said tube is formed of a plastic having memory, such as a polymerized fluorocarbon, and heating the tube while the corrugation is being formed; and cooling the tube after formation by rapid quenching from the forming temperature while the tube and corrugations are maintained in the desired final shape to stabilize it in its final shape.

5. The method as set forth in claim 2, further characterized by the step of forming said corrugation to its final shape by compression against external restraining means to set its shape against subsequent deformation.

6. The method of forming a corrugated tube, which comprises: forming a corrugation first into a flat-sided shape with the radial depth of the corrugation substantially greater than its axial width; and subsequently expanding the corrugation into a toroidal shape in which the flat sides and periphery are shaped to have a generally circular shape in section over an arc which is considerably greater than 180 degrees and free from flattening on the outer periphery.

7. The method as set forth in claim 6, further characterized by the fact that said corrugation, at least in the final stage, is formed by the step of compressing it against external confinement in a form-fitting jacket to stabilize its shape against subsequent creep deformation.

8. The method of forming a laminated corrugated tube having an inner liner of plastic polymerized fluorocarbon material which has memory, which comprises: placing the plastic tube in a closely fitting metal jacket; confining the tube exteriorly around its circumference at spaced points along its length by ring die elements and forming a corrugation on the composite tube by forcing the ends together while applying internal fluid pressure to shape the plastic tube by compression within the confining jacket whereby to stabilize its final shape against subsequent creep deformation.

9. The method of forming a laminated corrugated tube having an inner lining of plastic polymerized fluorocarbon material which has memory, which comprises: closely fitting two sintered plastic tubular elements together in intimate surface contact within air inclusion between them so that thermal changes can be rapidly affected through the laminae thus formed and so that the elements can slide relative to each other during formation; confining the tube exteriorly around its circumference at spaced points along its length by ring die elements and forcing the ends together while applying internal fluid pressure within the composite tube to form a corrugation while heating the tube to a temperature above its expected service temperature; and quenching the tube when formed and while heated to prevent subsequent creep distortion.

10. The method of forming a plurality of corrugations on a tube, which comprises: placing a number of restraining bands on a tube at axially spaced points to leave unsupported portions between them to form corrugations of the desired size; placing flat-sided ring-shaped spacers above the edges of the bands to define radially flat faces; removing said spacers while leaving said bands in place; and applying fluid pressure within said tube to expand said corrugations into toroidal shape with a circular shape on the outer periphery in axial section.

11. The method of forming toroidal corrugations of approximately circular toric section, free from outer flatness, with a circular arc extending over considerably more than 180 degrees and having substantially uniform wall thickness throughout the arcuate portion, which comprises: forming flat-sided corrugations in the tube with a predetermined tube diameter at the base of the corrugations, with a predetermined axial dimension between corrugations, the axial dimension between corrugations being at least as great as the axial space required by the outer circular portions of the toroidal corrugations after being formed; and applying pressure inside the flat-sided corrugations while maintaining the diameter of the tube and the said axial dimensions substantially unchanged to form the flat-sided corrugations into toroidal shape.

12. The method as set forth in claim 11, which further comprises the step of maintaining said tube diameter and said axial dimensions by providing rigid circumferential inner ring spacing elements between corrugations at the radially inner portions adjacent the tube while leaving the radially outer portion of the corrugations free to expand into toroidal shape.

13. The method as set forth in claim 12, which further comprises the step of leaving the circumferential inner ring spacing elements on the tube after the corrugations have been formed thereon to prevent reduction of the axial distance between the radially inner portions of the corrugations in use and to reinforce the tube wall between corrugations.

References Cited by the Examiner

UNITED STATES PATENTS

| | | |
|---|---|---|
| 2,023,417 | 12/35 | Guarnaschelli. |
| 2,306,018 | 12/42 | Fentress. |
| 2,347,101 | 4/44 | Harding. |
| 2,446,281 | 8/48 | Harding. |
| 2,616,129 | 11/52 | Burton et al. |
| 2,712,157 | 7/55 | Holte. |
| 2,876,801 | 3/59 | November _____ 138—121 |
| 2,920,656 | 1/60 | Bertolet _____ 138—121 |
| 2,983,961 | 5/61 | Titterton et al. |
| 2,995,781 | 8/61 | Sipler. |
| 3,076,228 | 2/63 | Johnson _____ 264—100 |

FOREIGN PATENTS 652,810  5/51  Great Britain.

ROBERT F. WHITE, *Primary Examiner.*

EDWARD V. BENHAM, WILLIAM J. STEPHENSON, ALEXANDER H. BRODMERKEL, *Examiners.*